United States Patent [19]
Forbis

[11] 3,856,240
[45] Dec. 24, 1974

[54] PARACHUTE SUSPENSION LINES
[75] Inventor: John Conrad Forbis, Renton, Wash.
[73] Assignee: The Boeing Company, Seattle, Wash.
[22] Filed: Dec. 19, 1972
[21] Appl. No.: 316,446

[52] U.S. Cl............................. 244/142, 244/127
[51] Int. Cl............................................. B64d 17/24
[58] Field of Search .......... 244/142, 145, 146, 147, 244/148, 151 R, 151 A, 127, 138, 139, 140, 110 C; 87/2, 6, 11, 5, 8, 9; 24/DIG. 4; 287/230.5 TD, 75, 81, 265 CD; 57/144–147; 294/74; 124/23 R

[56] References Cited
UNITED STATES PATENTS

| | | | |
|---|---|---|---|
| 1,780,190 | 11/1930 | Hoffman............................. | 244/145 |
| 2,257,953 | 10/1941 | Haskell................................. | 87/11 |
| 2,501,670 | 3/1950 | Fogal................................. | 244/145 |
| 2,715,872 | 8/1955 | Klas................................. | 244/142 |
| 2,841,046 | 7/1958 | Runton................................. | 87/6 |
| 2,981,053 | 4/1961 | Harrison............................ | 124/23 R |
| 3,137,465 | 6/1964 | Mulcahy............................. | 244/142 |
| 3,456,908 | 7/1969 | Mayhew et al.................. | 244/110 C |

FOREIGN PATENTS OR APPLICATIONS

| | | | |
|---|---|---|---|
| 9,935 | 5/1908 | Great Britain........................ | 56/146 |
| 1,080,695 | 12/1954 | France............................ | 24/DIG. 4 |

OTHER PUBLICATIONS
George Daniels, "Amazing Plastic Ropes," Popular Science June 1964, pages 142–148.

Primary Examiner—Duane A. Reger
Assistant Examiner—Galen L. Barefoot
Attorney, Agent, or Firm—Brown, Murray, Flick & Peckham

[57] ABSTRACT

A minimum weight suspension line in the form of a braided filament rope is used in parachute apparatus to interconnect a payload with a canopy. To achieve the minimum weight characteristics of the suspension line, additional filament material is braided into the rope at the points of attachment to the canopy and the payload for increasing the strength of the line attachment point so that it is at least equal to the basic strength of the suspension line.

9 Claims, 5 Drawing Figures

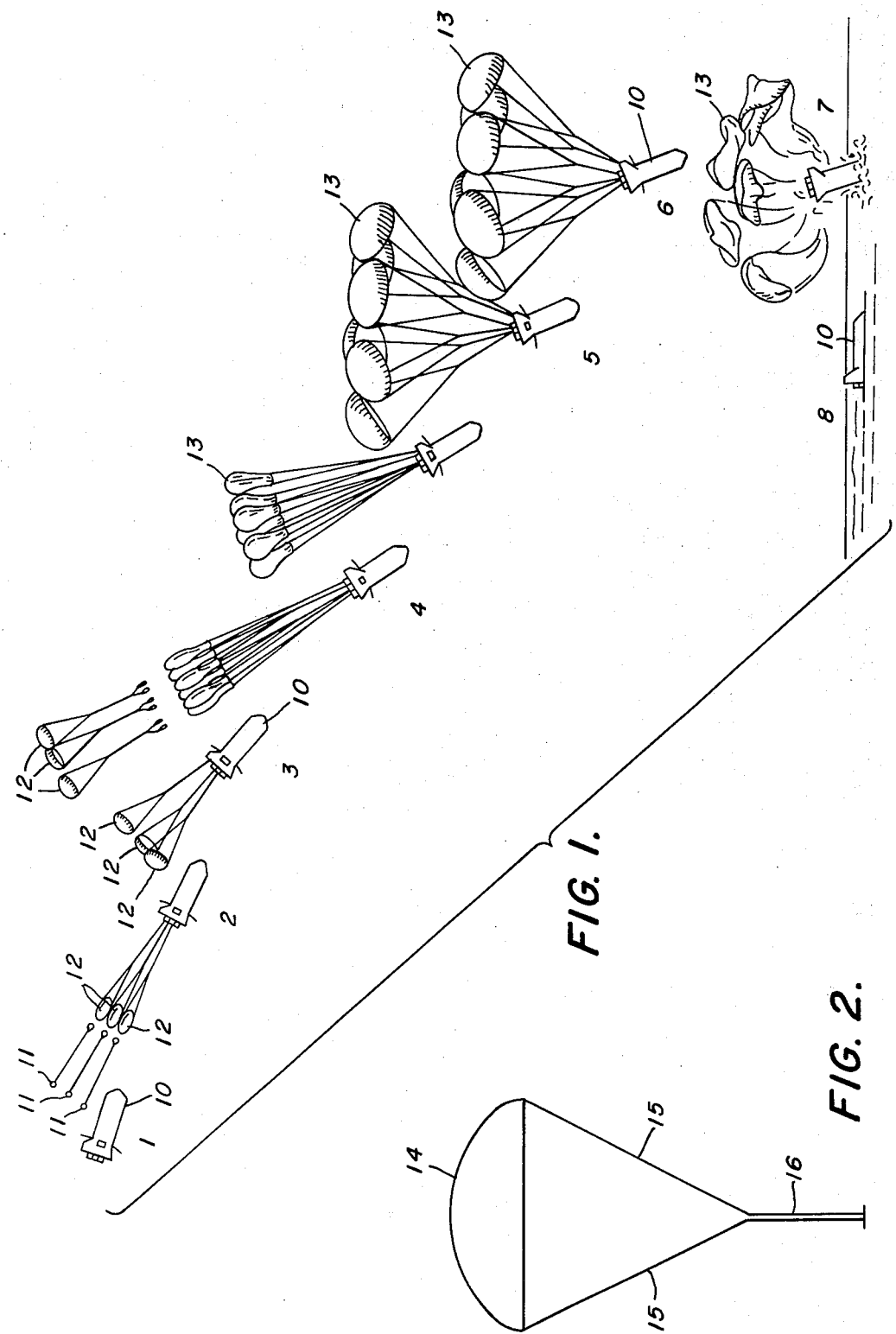

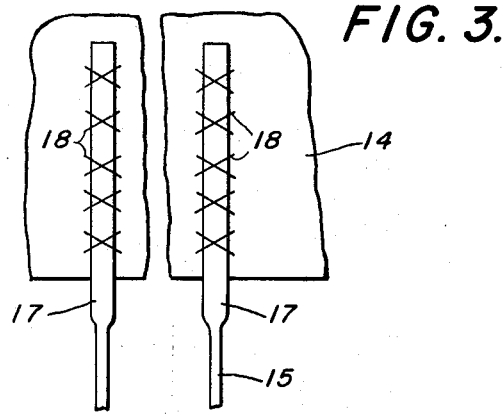
FIG. 3.
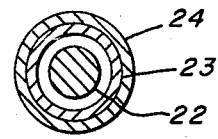
FIG. 4.
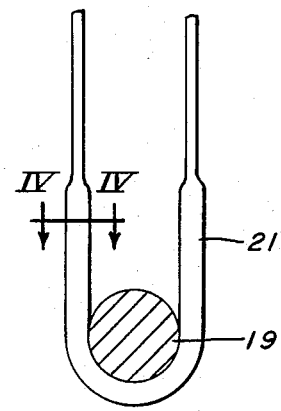
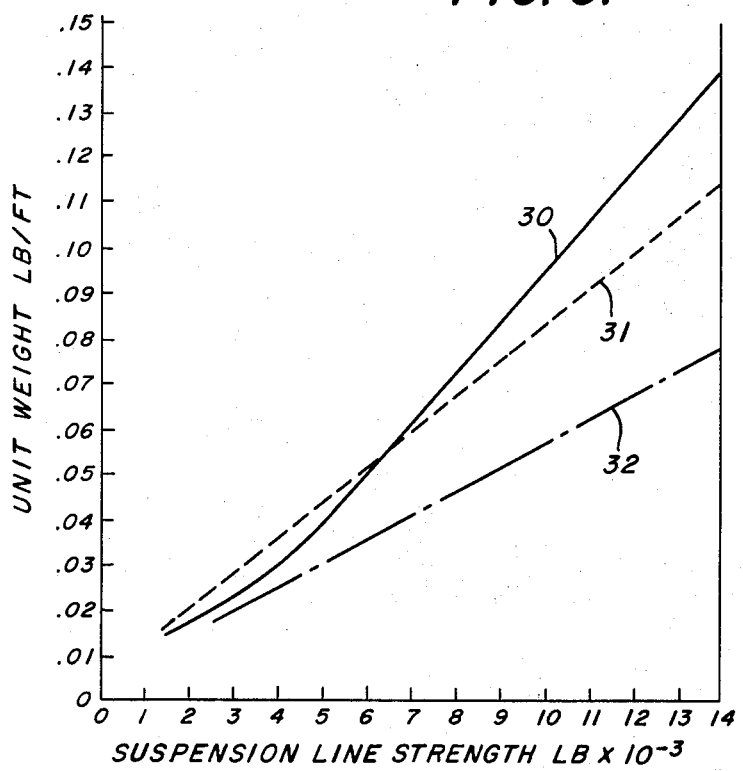
FIG. 5.

PARACHUTE SUSPENSION LINES

BACKGROUND OF THE INVENTION

This invention relates to an improved suspension line design for a parachute, and more particularly to increasing the strength of the suspension line along a short length thereof used for attachment to a canopy of a parachute and along a short length or segment of the suspension line used for attachment to the payload.

Parachute recovery systems have been particularly successful for the recovery of spacecrafts and similar hardware and parachute recovery systems have shown great promise for the recovery of booster hardware such as may be employed, for example, in a space shuttle program. The design of parachute recovery systems requires careful consideration particularly when hardware such as a booster has a recovery weight of between 200,000 and 1,300,000 pounds with the objective of a water impact velocity between 50 and 200 feet per second. Such a recovery system would be needed to decelerate a booster from an initial condition of mach number 0.6 to 1.2 at an altitude of 25,000 to 35,000 feet down to a terminal velocity condition of 50 to 200 feet per second at sea level for water impact. To carry out such an objective with a booster having a weight of 850,000 pounds at the time of recovery, parachute systems may take the form of six parachutes consisting of 2,100 pounds of canopy and 3,300 pounds of lines along with a drouge parachute system consisting of 800 pounds of canopies and 3,500 pounds of lines. This requires a total weight of the suspension and riser lines of 26,800 pounds. The magnitude of the suspension line weight renders it highly desirable to design lighter weight suspension lines. In this regard, present suspension line designs are loaded to less than 100 percent of the basic line strength. This is, it was discovered, due to a strength in efficiencies of the joints between the lines and the canopy and between the lines and the payload. In other words, it was not possible to transfer the basic loading capacity of the lines from the canopy or to the payload. Utilizing only 80 to 90 percent of the basic loading capacity has resulted from these inefficiencies.

SUMMARY OF THE INVENTION

It is a principal object of the present invention to provide a new lighter weight design of suspension lines for a parachute used to interconnect a payload with a canopy thereof.

It is another object of the present invention to provide an improved suspension line for a parachute for increased efficient use of the basic line strength of the suspension lines.

It is a further object of the present invention to provide an improved suspension line design wherein at the points of attachment of the line to the canopy and payload in a parachute system, the line incorporates additional material for increasing the line strength in excess of the basic line strength of the line.

According to one form of the present invention, there is provided a suspension line for use in a parachute apparatus to interconnect a payload with a canopy. A plurality of suspension lines are used, each taking the form of a braided filament rope having a preselected line strength, with additional filament material braided into the rope at the points of attachment to the canopy and at the points of attachment to the payload for increasing the line strength at these points. The length of the rope receiving the additional filament material is small in relation to the overall length of the rope so as to increase the load transfer efficiency at the point of attachment whereby the line strength of the rope at these points exceeds the preselected line strength, and means for securing the rope at the points of attachment to the canopy and payload.

These features and advantages of the present invention as well as others will be more fully understood when the following description is read in light of the accompanying drawings, in which:

FIG. 1 illustrates a typical parachute employment sequence of the final descent of a booster;

FIG. 2 illustrates a typical outline of parachute in accordance with the features of the present invention;

FIG. 3 is an enlarged view of the suspension lines illustrated in FIG. 2;

FIG. 4 is a sectional view taken along line IV—IV of FIG. 3; and

FIG. 5 is a graph illustrating the suspension line strength in relation to the unit weight of the suspension line.

The use of a parachute embodying the features of the present invention has a variety of applications which include a recovery system for deceleration of a space shuttle booster which was selected for the sole purpose of illustration only. With reference now to FIG. 1, there is illustrated such a recovery system intended to decelerate a booster 10 from an initial condition of mach number 0.6 to 1.2 at an altitude of 25,000 to 35,000 feet shown at position 1 in FIG.1. The weight of the booster considered for recovery lies typically between 200,000 and 1,300,000 pounds. The objective is to provide through a parachute recovery system a water impact velocity between 50 to 200 feet per second at position 8. Pilot chutes 11 are employed to extract larger drouge parachutes 12 shown by position 2. The drouge chutes are shown in their deployed condition at position 3. The drouge chutes, in turn, extract a cluster of main parachutes from the booster for final descent as shown by the sequence of positions 4, 5 and 6. The recovery system shown in FIG. 1 uses six main parachutes which, after the condition shown by position 6, are separated from the booster upon water impact, position 7. The booster then awaits recovery as illustrated in position 8. The trajectories considered for the booster deceleration system require a high parachute canopy loading. This requirement brought about the need for a parachute canopy which would yield good stability and high speed deployment performance. The high canopy loading can only be developed by a loading transfer to suspension and riser lines.

FIG. 2 illustrates a typical configuration of a parachute wherein a canopy 14 is connected with a plurality of spaced apart suspension lines 15 that are collected together in a packed form usually referred to as a riser 16. The suspension lines including those in the riser pack represent between 35 to 80 percent of the parachute pack weight depending upon the length of the lines required to develop the best canopy efficiency. The drouge chutes 12 each, for example, may contain 128 suspension lines each having a basic line strength of 14,000 pounds connected to a 70-foot diameter parachute. Each of the drouge chutes would then have a pack weight of approximately 4,300 pounds. The main parachute 13 typically each comprise 160 suspension lines with a basic line strength of 6,000 pounds to support a 160-foot diameter canopy. This would result in a pack weight of 5,400 pounds for each of the six parachutes.

According to the present invention, there is provided an improved suspension line design for parachutes directed toward increased efficient use of the basic line strength. Thus, for example, if the efficient use of the line strength for the parachute is between 80 to 90 percent, then the recovery system would require an increased weight of the suspension lines of between 2,000 to 4,000 pounds per recovery system. The present invention provides, in order to avoid such increases in the line weights, an improved suspension line design wherein the line strength at the attachment points is increased so that the joint efficiencies will not decrease the joint strength below the basic line strength.

As shown in FIG. 3, each of a plurality of suspension line 15 has both terminal ends 17 attached by stitching 18 to the canopy 14. The rope used to form the suspension line has an increased strength along a short length at the end of the rope. The actual length of the rope provided with an increased strength is small with respect to its overall length which may be of the order of 350 feet long. The rope in the form as illustrated in FIG. 3 actually has three lengths or sections where its basic strength is substantially increased. Two of the sections are at the terminal ends of the rope where they are attached to the canopy 14. The third section is located where the rope is attached to the payload which, according to FIG. 1, is the booster 10. In order to attach the parachute to the booster, means such as pin 19 are employed.

It is important to note that the increase in the basic line strength is made at the attachment points so that the joint efficiency will not decrease the joint strength below the basic line strength. This is accomplished by backsplicing or braiding the line ends 17 before stitching the line to the canopy material. Additional rope material is braided into the suspension lines at 21 where the line is attached to the payload. This is clearly shown by FIG. 4, wherein the line consists of a braided cord 22 enclosed within a braided sleeve 23 which together form the basic suspension line. In order to increase its strngth at this point, additional material is braided into the form of a sleeve 24. This results in an increased diameter of the line for a short length on either side of the pin 19.

FIG. 5 is a graph illustrating the line strength per unit weight of various rope material typically used to form the suspension lines. Curve 30 is a two-in-one braided rope manufactured by Samson Cordage Works. The graph line 31 represents a cordless nylon cord. The graph line 32 represents a nylon webbing form of suspension line. By employing these features of the present invention, suspension lines for parachutes can be loaded up to and including 100 percent of their basic line strength while realizing substantial savings in the weight required for the suspension lines.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. A suspension line for use in parachute apparatus to interconnect a payload with a canopy, the combination comprising:

braided filament rope having a preselected line strength, additional filament material braided into the rope along preselected lengths at the points of attachment to the canopy and to the payload for increasing the load transfer strength at such points, the length of rope receiving said additional filament material being small in relation to the overall length of the rope so that the efficiency for load transfer at the point of attachment at least equals the basic strength of the rope, and means for attaching the rope having said additional filament material to the canopy.

2. A suspension line according to claim 1 wherein said additional filament material is braided into each end of the rope along a length thereof which is small in relation to the overall length of the rope.

3. A suspension line according to claim 2 wherein said additional filament material is braided into a short length of said rope at the midpoint thereof for attachment to a payload whereby the efficiency for load transfer at least equals the basic strength of the rope.

4. A suspension line according to claim 3 wherein said braided filament material is further defined as a nylon webbing.

5. A suspension line according to claim 3 wherein said braided filament material is further defined as a coreless nylon cord.

6. A suspension line according to claim 3 wherein said braided filament material is further defined as a two filament in one braided rope.

7. A suspension line according to claim 3 wherein a plurality of said suspension lines are arranged about the periphery of said canopy and said lines being collected into a bundle to form a riser.

8. A suspension line according to claim 3 wherein said means for attaching comprises stitching of a filament between said canopy and said suspension line.

9. A suspension line according to claim 3 wherein said braided filament material comprises a braided core of filament and a braided filament cover sleeve for enclosing said core.

* * * * *